Patented Feb. 20, 1951

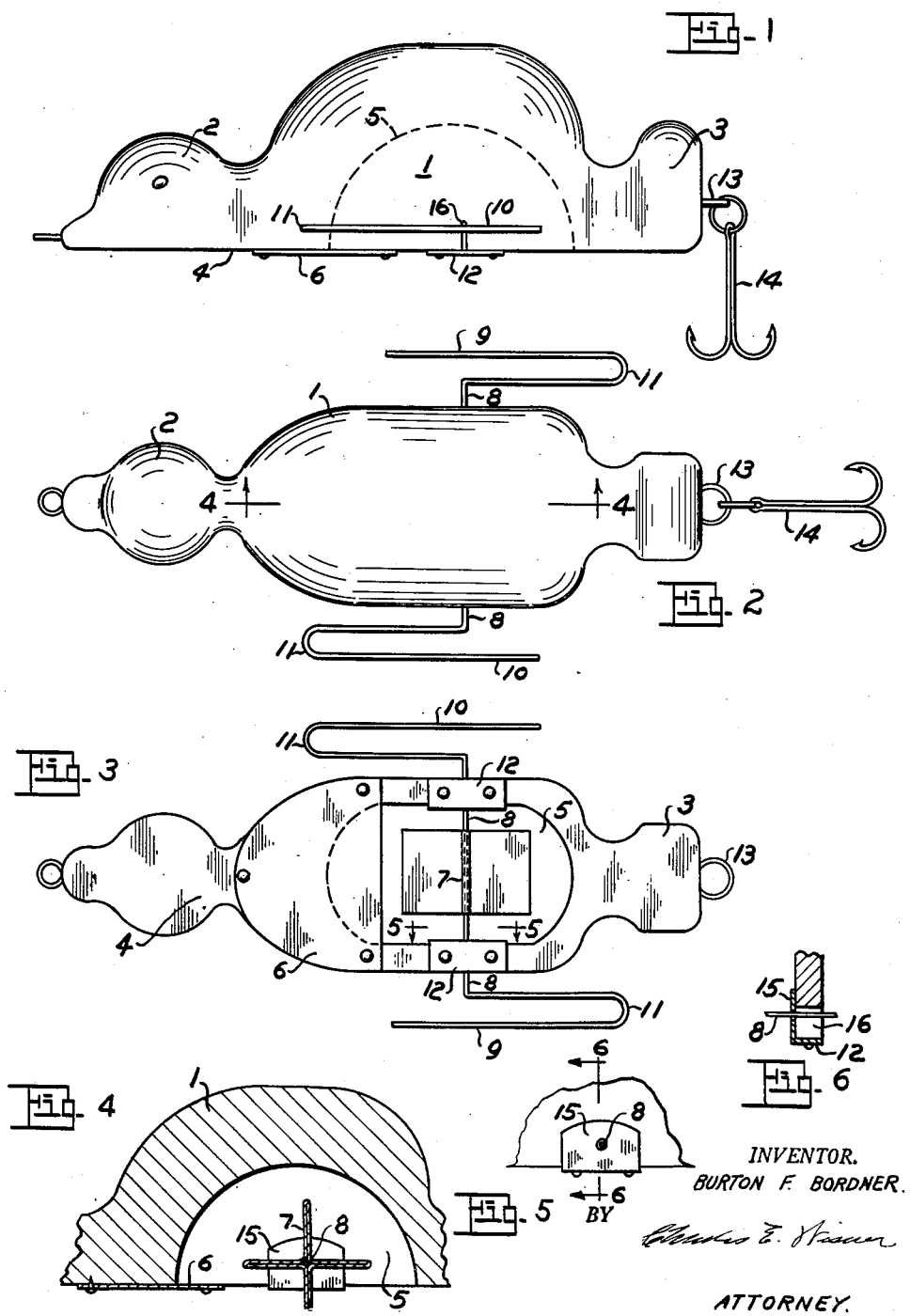

2,542,622

UNITED STATES PATENT OFFICE 2,542,622

FISH LURE

Burton F. Bordner, Flint, Mich.

Application May 22, 1947, Serial No. 749,791

5 Claims. (Cl. 43—42.12)

This invention relates to an artificial fish lure, the object being to provide a new and improved form of lure having the resemblance of a duckling and includes a means on opposite sides thereof to splash the water after the manner of the wings of a baby duck paddling in the water and a paddle wheel projecting from the under side of the body which produces an effect similar to that produced by the feet of a duck.

These and other objects and features of the invention are hereinafter more fully described and claimed and shown in the accompanying drawing in which—

Fig. 1 is a side elevation of my improved lure.

Fig. 2 is a plan view looking downwardly upon the lure.

Fig. 3 is a plan view of the under side of the bait.

Fig. 4 is a section taken on line 4—4 of Fig. 3 showing the paddle wheel within the body of the lure.

Fig. 5 is a section taken on line 5—5 of Fig. 3.

Fig. 6 is a section taken on line 6—6 of Fig. 5.

The lure according to my invention has a body 1 formed of wood or other substance that will float on the surface of water and a head-like portion 2 and a tail portion 3. The under surface 4 of the body is a plane surface and the body of the bait is recessed as indicated at 5 in Fig. 3. A plate 6 is secured to the under side of the body at the forward end of the recess and a paddle wheel 7 is supported on the shaft 8 which extends transversely of the body and at its opposite ends is bent at reverse angles to the shaft and return bent upon itself providing end portions 9 and 10.

The rounded ends 11 by rotation of the paddle wheel in drawing the lure along the surface of the water, strike and enter the water and thus produce an effect similar to that produced by the wings of a duckling attempting to swim. The shaft 8 is supported in recesses provided therefor on opposite edges of the body by means of plates 12 and the tail end 3 of the body is provided with an eyelet 13 to which a hook 14 is secured as indicated in Figs. 1 and 2.

Each plate 12 has a flange 15 extending into the recess of the body and the opposite side walls thereof are apertured to receive the shaft 8. The side walls each have recesses 16 through which the shaft extends.

The bait may be cast and retrieved or may be trolled, and in casting the bait the disturbance of the water caused by the bait striking the same simulates a young duck dropping on the surface of the water and then swimming. The commotion in the water produced by casting the bait attracts the fish at some distance from the body. Due to the body being immediately moved after striking the water, the action of the bait on the water simulates that of a young duckling.

The bait may be made in any desired size, the larger size being preferable in fishing for muskellunge and larger sizes of pike and bass. The body of the bait may be painted in colors resembling that of a baby duck or otherwise colored as may be desired.

Having thus briefly described my improved fish lure and manner of use what I claim and desire to secure by Letters Patent of the United States is—

1. A fish lure comprising a body of a material tending to float on the surface of water and having a plane under surface, said body having a recess opening through the under surface thereof, a shaft extending transversely of the body and through the recess, a paddle wheel on the shaft within the recess, the ends of the shaft on each side of the body being return bent, the arrangement providing that in drawing the lure on the water the paddle wheel is caused to rotate thereby causing the said shaft ends to splash the water thereby causing a disturbance thereof similar to that produced by the wings of a duckling, and a hook at the tail end of the body.

2. A fish lure comprising a wooden body having a plane under surface and a recess opening through the said surface, a shaft extending transversely of the body and through the recess, a paddle wheel on the shaft in the recess, the ends of the shaft on each side of the body being bent at a right angle thereto and then return bent in spaced parallel relation with the first named portion providing a means whereby, in drawing the lure on the water, the paddle wheel is caused to rotate thereby causing the said end portions of the shaft to enter the water and rise therefrom thereby causing a disturbance in the water similar to that produced by the wings of a duckling in attempting to swim, and a hook secured to the body in such position that in striking the lure the fish is hooked.

3. A fish lure comprising a body formed of a material that floats on the water and having a plane under surface, the body having a recess opening through the under surface thereof, a shaft extending transversely of the body and through the recess, a paddle wheel secured upon the shaft within the recess of such character that, when the lure is drawn on the surface of the water, the shaft is rotated, the ends of the shaft on each side of the body being oppositely bent at right angles thereto so that the water is agitated thereby as the shaft revolves, and a hook element secured to the body in such position that the fish in striking the bait strikes the hook.

4. A fish lure, comprising a body of a material tending to float on the surface of water and having a plane under surface, the body being of a form and color to simulate a duckling, the body having a recess opening through the under surface thereof, a paddle wheel rotatably supported in the recess provided therefor in the body, a shaft extending transversely to the body and the recess, joined to said paddle wheel, arms on each side of the body attached to the respective shaft ends at right angles thereto whereby in drawing the lure on the surface of the water the said arms tend to agitate the water thereby producing an effect similar to that of the wings of a duckling in striking the surface of the water, and a hook element attached to the body in such position that a fish in striking the bait will strike the hook.

5. A fish lure having a body, the upper surface of which simulates that of a member of the bird family, the body having a forward end similar to the head of a bird and having an element on each side of the head simulating that of the eyes of a bird, the body being colored to resemble a bird, the body having a recess opening through the under surface thereof, a shaft extending transversely to the body and said recess, a paddle wheel rotatably supported and secured upon said shaft within said recess, and oppositely extending arms on each side of the body joined to the respective shaft ends at right angles thereto.

BURTON F. BORDNER.

REFERENCES CITED

The following references are of record in the file of this patent:

UNITED STATES PATENTS

| Number | Name | Date |
|---|---|---|
| 1,313,476 | Ewert | Aug. 19, 1919 |
| 1,614,829 | Conlon | Jan. 18, 1927 |
| 2,159,230 | Sage | May 23, 1939 |
| 2,341,234 | O'Byrne | Feb. 8, 1944 |